June 24, 1969  J. P. MAKINEN  3,451,720
VEHICLE PASSENGER RESTRAINT HARNESS
Filed Dec. 8, 1967  Sheet 1 of 2

INVENTOR.
John P. Makinen
BY
David A. Greenlee
ATTORNEY

June 24, 1969  J. P. MAKINEN  3,451,720

VEHICLE PASSENGER RESTRAINT HARNESS

Filed Dec. 8, 1967  Sheet 2 of 2

INVENTOR.
John P. Makinen
BY
David A. Greenlee
ATTORNEY

United States Patent Office 3,451,720
Patented June 24, 1969

3,451,720
VEHICLE PASSENGER RESTRAINT HARNESS
John P. Makinen, Royal Oak, Mich., assignor to General Motors Corporation, Detroit, Mich., a corporation of Delaware
Filed Dec. 8, 1967, Ser. No. 689,118
Int. Cl. B60r 21/10; A47c 31/00
U.S. Cl. 297—389    6 Claims

ABSTRACT OF THE DISCLOSURE

A vehicle seat is provided with a three-point passenger restraint harness comprising a lap strap anchored to the vehicle floor, a shoulder strap anchored to the vehicle roof side rail, and an anchor strap anchored to the vehicle floor. The free ends of the lap and shoulder straps each amount a buckle which is engageable with a buckle assembly mounted on the free end of the anchor strap to form respective lap and shoulder belt portions of the harness. The anchor buckle assembly cannot be engaged with the shoulder strap buckle until after engagement with the lap strap buckle.

---

This invention relates generally to vehicle passenger restraint harnesses and more particularly to such a harness which includes both lap and shoulder belt portions.

Many different types of restraint harnesses for automobile passengers are on the market today and generally fall into two categories; the three-point harness having three strap portions and three anchorages, and the two belt-four point harness comprising separate lap and shoulder belts and four anchorages.

An advantage of the two belt-four point system is that the vehicle passenger, if he does not choose to utilize the shoulder belt, may utilize the lap belt alone. This is not possible with most three-point harnesses, which give the passenger no choice but to use the shoulder belt with the lap belt. This disadvantage results from a permanent interconnection between the lap and shoulder belts.

To overcome this disadvantage, a three-point harness has been devised which has a separable shoulder belt which permits usage of the lap belt alone, when desired. However, this harness arrangement permits usage of the shoulder belt without the lap belt.

This invention provides a three-point harness in which the user thereof has the option of using only the lap belt or both belts, but in which the shoulder belt cannot be used unless the lap belt is being used.

An object of this invention is to provide a three-point harness having a shoulder belt buckle which cannot be coupled to an anchorage until after the lap belt buckle has been coupled.

Another object is to provide an automatic blocking device on the anchorage which normally blocks the coupling of the shoulder belt buckle to the anchorage and is deactuated by coupling of the lap belt buckle to the anchorage.

These and other objects of this invention will become readily apparent upon reference to the following detailed description of the annexed drawings in which.

Figure 1:
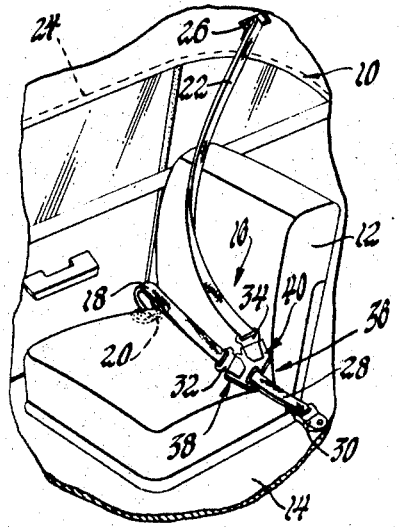
FIGURE 1 is a partial perspective view of the interior of a vehicle body provided with a passenger restraint harness according to this invention.

Referring now to FIGURE 1 of the drawings, a motor vehicle body, indicated at 10, is provided with a passenger seat 12 which is conventionally mounted on the vehicle floor 14. Seat 12 is provided with an occupant restraint harness, generally indicated 16, which includes a lap strap 18, mounted on the floor 14 at 20, a shoulder strap 22, mounted on the vehicle roof side rail 24 at 26, and an anchorage or anchor strap 28, mounted on the vehicle floor 14 at 30. The mountings 20, 26 and 30 may be conventional fixed anchorages or may comprise retractors of the locking or nonlocking type.

Straps 18 and 22 terminate in respective buckles or D-rings 32 and 34 which are interengageable with an anchorage coupling member or buckle assembly 36 mounted on the free end of strap 28 to form respective lap and shoulder belt portions of the harness.

Referring now to FIGURES 2 through 6, buckle assembly 36 includes buckles 38 and 40 connected by a common base 42 which is conventionally secured to the free end of strap 28.

Figure 2:
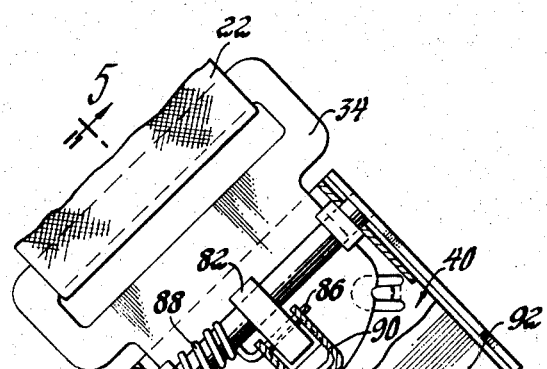
FIGURE 2 is an enlarged partially broken away view of a portion of FIGURE 1 showing the buckle assembly for the harness.
Figure 2:
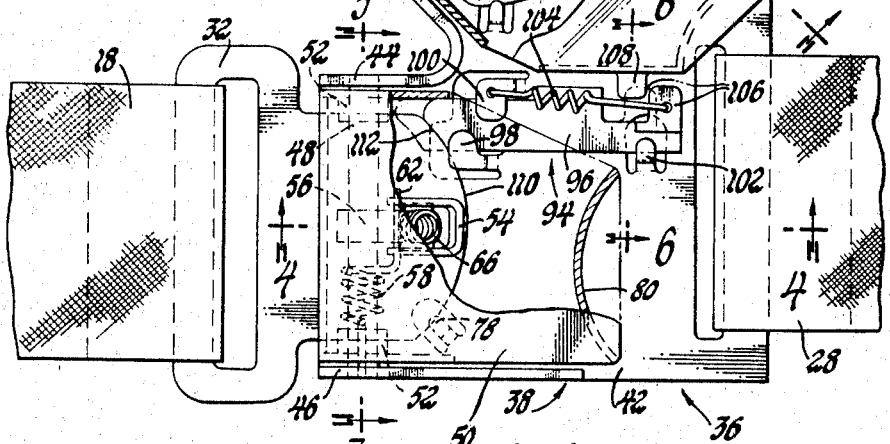
Figure 3:
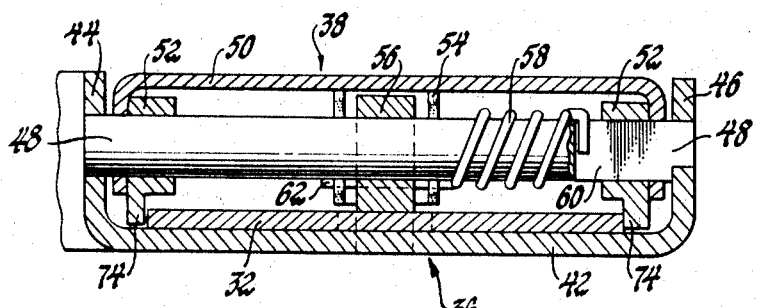
FIGURE 3 is an enlarged sectional view taken generally on the line 3—3 of FIGURE 2.
Figure 4:
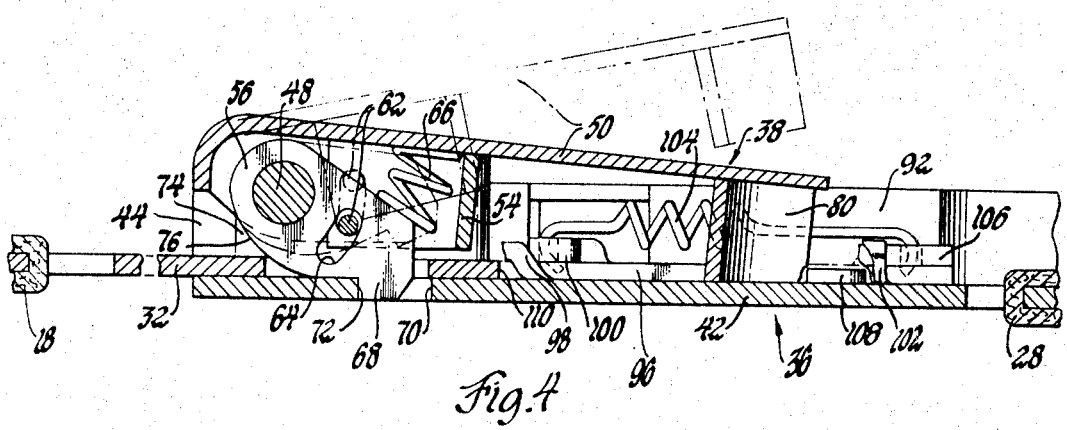
FIGURE 4 is an enlarged sectional view taken generally on the line 4—4 of FIGURE 2.

As shown in FIGURES 2 through 4, base 42 includes upturned flange portions 44 and 46 which nonrotatably mount a pivot pin 48 that journals an unlatching member or cover 50 of buckle 38. Cover 50 is located axially on pin 48 by spacers 52 which are press-fitted on pin 48. Cover 50 includes a depending U-shaped housing 54 which houses a latching pawl 56 journalled on pin 48.

A torsion spring 58 is wrapped around pin 48 and has one bent end fixed within a pin slot 60. The other bent end 62 of spring 58 extends through aligned apertures in housing 54 and through an arcuate slot 64 in pawl 56. Spring end 62 and slot 64 provide a lost motion connection between cover 50 and pawl 56. A compression spring 66 is confined within housing 54 and biases the pawl 56 downwardly into engagement with base 42 so that pawl tab 68 enters a base aperture 70 and engages a base locking shoulder 72.

To form the lap belt, D-ring 32 is initially inserted between depending guide portions 74 of spacers 52 until its leading edge portion engages a cam surface 76 on the pawl. Further insertion cams pawl 56 upwardly against the force of spring 66 and permits the D-ring to pass beneath tab 68 and into engagement with a lanced out base stop 78, FIGURE 2. Slot 64 enables the D-ring to raise the pawl 56 without moving cover 50. When the D-ring passes tab 68, spring 66 biases pawl 56 through the D-ring aperture to engage tab 68 with shoulder 72. Any withdrawal movement of D-ring 32 is prevented by pawl 56.

When it is desired to unfasten the lap belt, a curved depending rear handle portion 80 of cover 50 is grasped to rotate the cover counterclockwise about pin 48 against the force of spring 58. Spring end 62 engages the upper end of slot 64 to raise pawl 56 sufficiently to permit withdrawal of D-ring 32. Handle portion 80 engages base 42 to locate cover 50 in closed position.

Figure 5:
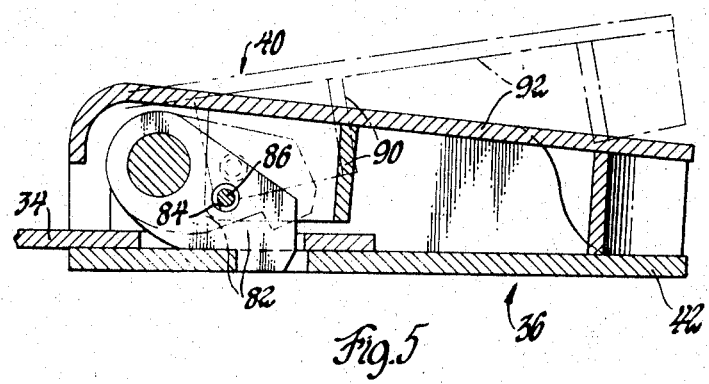
FIGURE 5 is an enlarged sectional view taken generally on the line 5—5 of FIGURE 2.

Referring now to FIGURES 2 and 5, buckle 40 is similar to buckle 38 and will be described only to the extent that it is different. Pawl 82 has aligned circular apertures 84 instead of arcuate slots. The bent end 86 of spring 88 extends through aligned apertures in the pawl housing 90 of cover 92 and the circular apertures 84. This arrangement locks cover 92 and pawl 82 together so that, when D-ring 34 is inserted, upward movement of pawl 82 forces cover 92 upwardly against the force of spring 88. Thus, D-ring 34 cannot be inserted unless cover 92 is free to move.

To preclude formation of the shoulder belt before formation of the lap belt, a blocking device 94 is provided to block coupling of D-ring 34 to buckle 40 prior to coupling D-ring 32 to buckle 38, as will now be described with reference to FIGURES 2, 4 and 6.

Figure 6:
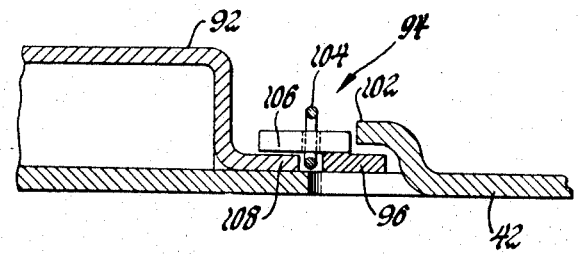
FIGURE 6 is an enlarged sectional view taken generally on the line 6—6 of FIGURE 2.

Blocking device 94 comprises a sliding member 96 which is confined to slide longitudinally of base 42 by lanced out bent tabs or guides 98, 100 and 102, such as shown in FIGURE 6. A tension spring 104 extends between guide 100 and an offset flange 106 of member 96 to bias the member 96 to its dashed line position shown in FIGURE 2, and into engagement with the portion 74 of one of the spacers 52. In this position, flange 106 overlies a locking tab 108 formed integrally with cover 92, preventing any movement thereof, as shown in FIGURE 6. Thus, when member 96 is in the phantom line position of FIGURE 2, D-ring 34 cannot be inserted because cover 92 cannot be moved.

To release cover 92, member 96 is moved to the solid line position of FIGURE 2 by insertion of D-ring 32 into buckle 38, as will now be described with reference to FIGURES 2 and 4. As D-ring 32 is inserted, the leading edge 110 thereof engages an abutment or edge 112 of member 96 and moves the member to the right to its full line position against the force of spring 104. This disengages flange 106 from tab 108 as shown in FIGURE 2 and permits movement of cover 92 to enable insertion of D-ring 34 within buckle 40 to form a shoulder belt of straps 22 and 28. Guide portions 74 laterally position D-ring 32 relative to member 96 to assure that tab 108 is not disengaged until the D-ring is fully latched to buckle 38.

Thus it is impossible to latch D-ring 34 to buckle 40 until D-ring 32 has been latched to buckle 38, because of blocking member 96. This precludes formation and use of the shoulder belt portion 22, 28 of harness 16, until formation and use of lap belt portion 18, 28.

As a further precaution, the buckles and D-rings can be constructed so that D-ring 34 is too large to fit into buckle 38.

While only a preferred embodiment of this invention has been shown and described, modifications thereof are contemplated within the scope of this invention.

I claim:

1. In combination with a vehicle body having a lap strap, an anchor strap and a shoulder strap, each mounted adjacent one end thereof to the vehicle body, buckle means for engaging the free ends of the lap, shoulder and anchor straps to form a harness of lap and shoulder belts comprising, a first buckle mounted on the free end of the lap strap, a second buckle mounted on the free end of the shoulder strap, a buckle assembly mounted on the free end of the anchor strap and engageable with the first buckle to form a lap belt of hte lap strap and anchor strap and engageable with the second buckle to form a shoulder belt of the shoulder strap and the anchor strap, and blocking means on the buckle assembly blocking engagement thereof with the second buckle until after engagement thereof with the first buckle to prevent formation of the shoulder belt until after formation of the lap belt.

2. The combination of claim 1, wherein the buckle assembly includes a third buckle for engagement with the first buckle, and a fourth buckle for engagement with the second buckle; and wherein the blocking means include a blocking member mounted on the buckle assembly for movement between a first position blocking engagement of the second and fourth buckles and a second position permitting such engagement, positioning means normally positioning the blocking member in the first position, and means responsive to the engagement of the first and third buckles to move the blocking member to the second position.

3. The combination of claim 2, wherein the second and fourth buckles include interengageable latch means and the fourth buckle includes an unlatching member movable between a first position preventing interengagement of the latch means and a second position permitting such interengagement, the blocking member in the first position blocking movement of the unlatching member from the first to the second positions thereof.

4. The combination of claim 2, wherein the positioning means include spring means normally biasing the blocking member to first position, and the responsive means include an abutment on the blocking member engageable by the first buckle to move the blocking member against the force of the spring means to the second position.

5. In a vehicle body having a lap strap and a shoulder strap, each mounted adjacent one end thereof to the body and each mounting a buckle at the free end thereof, and a coupling member mounted on the vehicle body engageable with the lap strap buckle to form a lap belt and engageable with the shoulder strap buckle to form a shoulder belt, the improvement comprising, blocking means carried by the coupling member and operable to prevent interengagement of the shoulder strap buckle with the coupling member until after interengagement of the lap strap buckle with the coupling member.

6. The improvement of claim 5, wherein the coupling member comprises a base anchored to the vehicle body, a latching member engageable with the shoulder strap buckle, and an unlatching member for moving the latching member between latched and unlatched positions; and wherein the blocking means comprises a blocking member slidably mounted on the coupling member and movable between a first position engaging the unlatching member to prevent movement thereof to unlatched position and a second position out of engagement with the unlatching member to permit movement thereof, spring means normally biasing the blocking member into the first position, and an abutment formed on the blocking member and engageable by the lap strap buckle upon interengagement thereof with the first latching member to move the blocking member to the second position, thereby blocking formation of the shoulder belt prior to formation of the lap belt.

References Cited

UNITED STATES PATENTS

| | | | |
|---|---|---|---|
| 2,255,258 | 9/1941 | Lethern et al. | 24—75 X |
| 2,899,732 | 8/1959 | Cushman | 24—205.17 |
| 3,104,439 | 9/1963 | Martin | 24—205.17 |
| 3,106,004 | 10/1963 | Davis | 24—205.17 |
| 3,233,941 | 2/1966 | Selzer | 297—389 |
| 3,378,301 | 4/1968 | Romanzi et al. | 297—389 |

JAMES T. McCALL, *Primary Examiner.*

U.S. Cl. X.R.

24—205.17, 203, 230